United States Patent
Sudo et al.

(10) Patent No.: US 9,802,867 B2
(45) Date of Patent: Oct. 31, 2017

(54) GYPSUM HARDENED BODY, GYPSUM PANEL, METHOD FOR MANUFACTURING GYPSUM HARDENED BODY, AND METHOD FOR MANUFACTURING GYPSUM BOARD

(71) Applicant: YOSHINO GYPSUM CO., LTD., Tokyo (JP)

(72) Inventors: Ushio Sudo, Tokyo (JP); Hiroaki Itano, Tokyo (JP); Yosuke Sato, Tokyo (JP); Tomoaki Sawada, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 15/308,947

(22) PCT Filed: May 23, 2014

(86) PCT No.: PCT/JP2014/063739
§ 371 (c)(1),
(2) Date: Nov. 4, 2016

(87) PCT Pub. No.: WO2015/170421
PCT Pub. Date: Nov. 12, 2015

(65) Prior Publication Data
US 2017/0073271 A1    Mar. 16, 2017

(30) Foreign Application Priority Data
May 8, 2014   (JP) ................................ 2014-097160

(51) Int. Cl.
C04B 28/14       (2006.01)
C04B 22/16       (2006.01)
E04C 2/04        (2006.01)
C04B 103/12      (2006.01)
C04B 111/00      (2006.01)

(52) U.S. Cl.
CPC .............. *C04B 28/14* (2013.01); *C04B 22/16* (2013.01); *C04B 28/147* (2013.01); *E04C 2/043* (2013.01); *C04B 2103/12* (2013.01); *C04B 2111/0062* (2013.01); *C04B 2111/00094* (2013.01); *C04B 2111/00603* (2013.01); *C04B 2201/20* (2013.01)

(58) Field of Classification Search
CPC ......... C04B 22/16; C04B 24/04; C04B 24/06; C04B 28/14; C04B 28/147; C04B 38/10; C04B 2103/12; C04B 2111/0062; C04B 2111/00094; C04B 2111/00603; C04B 2201/20; E04C 2/043
See application file for complete search history.

(56) References Cited

U.S. PATENT DOCUMENTS

2005/0126437 A1   6/2005  Tagge et al.
2012/0160133 A1   6/2012  Veeramasuneni et al.

FOREIGN PATENT DOCUMENTS

| JP | S60-231476 | 11/1985 |
| JP | H6-321659 | 11/1994 |
| JP | 2002-145655 | 5/2002 |
| JP | 2007-535583 | 12/2007 |
| WO | 2012/087608 | 6/2012 |

OTHER PUBLICATIONS

Japanese Office Action dated Oct. 28, 2014.
Extended European Search Report for 14891285.0 dated Apr. 11, 2017.

*Primary Examiner* — Anthony J Green
(74) *Attorney, Agent, or Firm* — IPUSA, PLLC (57) ABSTRACT

A gypsum hardened body including a gypsum slurry that has been hardened is provided. The gypsum slurry is obtained by mixing calcined gypsum, calcium hydrogen phosphate dihydrate, water, and foam. The specific gravity of the gypsum hardened body is greater than or equal to 0.3 and less than or equal to 0.8.

13 Claims, 4 Drawing Sheets

GYPSUM HARDENED BODY, GYPSUM PANEL, METHOD FOR MANUFACTURING GYPSUM HARDENED BODY, AND METHOD FOR MANUFACTURING GYPSUM BOARD

TECHNICAL FIELD

The present invention relates to a gypsum hardened body, a gypsum panel, a method for manufacturing a gypsum hardened body, and a method for manufacturing a gypsum board.

BACKGROUND ART

Gypsum hardened bodies are used in various applications such as building materials. In recent years, there has been a growing demand for lightweight gypsum hardened bodies with a low specific gravity in order to improve thermal insulation, sound insulation, fire resistance, workability, and ease in handling, for example.

However, the physical strength of a gypsum hardened body is known to decrease as its specific gravity decreases. Also, gypsum panels that include gypsum hardened bodies as their core material are known, such as a gypsum board having base paper arranged on its surface, a gypsum panel using a glass mat as its surface material, and a gypsum panel having glass tissue embedded in its surface, for example. It is known that the strength of such gypsum panels also decreases as the specific gravity of the gypsum hardened bodies used as their core material decreases.

In this respect, methods for strengthening a gypsum hardened body have been contemplated.

For example, Patent Document 1 describes how a specific substituted starch can enhance the core strength of a gypsum wallboard. Further, hydroxyethylated starch is mentioned as an example of such a specific substituted starch.

PRIOR ART DOCUMENTS

Patent Documents

Patent Document 1: PCT Japanese Translation Patent Publication No. 2007-535583

SUMMARY OF THE INVENTION

Problem to be Solved by the Invention

However, according to the method of enhancing the gypsum core strength of the gypsum wallboard described in Patent Document 1, a specific substituted starch, which is an organic substance, has to be added to the gypsum core as a material of the gypsum wallboard. When an organic substance is added as a material of the gypsum wallboard, non-combustibility of the gypsum wallboard is degraded. As such, the amount of substituted starch that can be added has to be restricted in order to maintain non-combustibility of the gypsum wallboard, and as such, the strength of the gypsum wallboard cannot be adequately enhanced. In this respect, there is a demand for a gypsum hardened body including a strengthening agent that is made of an inorganic material that does not affect the non-combustibility of the gypsum hardened body.

The present invention has been conceived in view of the foregoing problems associated with the prior art, and it is an object of the present invention to provide a gypsum hardened body including an inorganic strengthening agent and having a low specific gravity.

Means for Solving the Problem

According to one embodiment of the present invention, a gypsum hardened body including a gypsum slurry that has been hardened is provided. The gypsum slurry is obtained by mixing calcined gypsum, calcium hydrogen phosphate dihydrate, water, and foam. The specific gravity of the gypsum hardened body is greater than or equal to 0.3 and less than or equal to 0.8.

Advantageous Effect of the Invention

According to an aspect of the present invention, a gypsum hardened body including an inorganic strengthening agent and having a low specific gravity may be provided.

EMBODIMENTS FOR IMPLEMENTING THE INVENTION

In the following, embodiments of the present invention are described with reference to the accompanying drawings. Note, however, that the present invention is not limited to the embodiments described below, and numerous variations and modifications of the embodiments described below may be made without departing from the scope of the present invention.

(Gypsum Hardened Body, Gypsum Panel)

Example configurations of a gypsum hardened body and a gypsum panel according to embodiments of the present invention are described below.

A gypsum hardened body according to an embodiment of the present invention includes a gypsum slurry that has been hardened, wherein the gypsum slurry is obtained by mixing calcined gypsum, calcium hydrogen phosphate dihydrate, water, and foam. The gypsum hardened body according to the present embodiment may have a specific gravity greater than or equal to 0.3 and less than or equal to 0.8.

In the following, components of the gypsum slurry used as materials of the gypsum hardened body are described.

Calcined gypsum is also known as calcium sulfate halfhydrate, and is an inorganic composition having hydraulic properties. Examples of calcined gypsum include one of or a combination of β-calcined gypsum and α-calcined gypsum. β-calcined gypsum may be obtained by calcining one of or a combination of natural gypsum, by-product gypsum, flue-gas gypsum, and waste gypsum in the atmosphere. α-calcined gypsum may be obtained by calcining one of or a combination of the above types of gypsum in water (including steam). Note that a small amount of type III anhydrous gypsum that is generated upon obtaining the calcined gypsum may be included in the calcined gypsum.

The calcined gypsum used as a raw material for the gypsum hardened body according to the present embodiment preferably includes β-calcined gypsum. More preferably, the calcined gypsum used as the raw material for the gypsum hardened body includes β-calcined gypsum as its main component. Note that the β-calcined gypsum constituting the main component of the calcined gypsum used as the raw material for the gypsum hardened body refers to a case where β-calcined gypsum constitutes more than 50% (in terms of parts by mass) of the calcined gypsum used as the material of the gypsum hardened body. In some examples, the calcined gypsum used as the raw material for the gypsum hardened body according to the present embodiment may only include β-calcined gypsum.

In the case of producing α-calcined gypsum, gypsum dihydrate, such as natural gypsum, has to be compressed and calcined in water or steam using an autoclave. In contrast, β-calcined gypsum can be produced by calcining gypsum dihydrate such as natural gypsum under normal pressure in the atmosphere. Thus, β-calcined gypsum can be produced at higher productivity as compared with α-calcined gypsum.

Also, according to investigations conducted by the inventors of the present invention, when calcined gypsum used as a raw material for a gypsum hardened body contains β-calcined gypsum, the strength of the gypsum hardened body can be substantially increased by adding calcium hydrogen phosphate dihydrate to the raw material. In particular, the higher the content of β-calcined gypsum, the greater the strengthening effect on the gypsum hardened body upon adding calcium hydrogen phosphate dihydrate.

For these reasons, the calcined gypsum used as the raw material for the gypsum hardened body according to the present embodiment preferably includes β-calcined gypsum as described above. More preferably, the calcined gypsum used as the raw material for the gypsum hardened body includes β-calcined gypsum at a high content ratio.

In the following, calcium hydrogen phosphate dihydrate ($CaHPO_4 \cdot 2H_2O$) is described.

The inventors of the present invention have conducted investigations on strengthening agents made of inorganic materials that can improve the strength (e.g. compressive strength) of a gypsum hardened body having a low specific gravity.

Through such investigations, the inventors of the present invention have discovered that by adding calcium hydrogen phosphate dihydrate, which is an inorganic material, to the raw material for a gypsum hardened body, the strength of the gypsum hardened body can be substantially increased as compared with a case where no calcium hydrogen phosphate dihydrate is added to the raw material for the gypsum hardened body, and based on such discovery, the inventors have conceived the present invention.

As described above, because calcium hydrogen phosphate dihydrate is an inorganic material, it can increase the strength of the gypsum hardened body without degrading the non-combustibility of the gypsum hardened body. Thus, by adding calcium hydrogen phosphate dihydrate, both adequate strength and non-combustibility can be achieved in a gypsum hardened body with a low specific gravity.

Calcium hydrogen phosphate is known to occur in three forms, i.e., anhydrous, monohydrate, and dihydrate. According to the investigations conducted by the inventors of the present invention, the dihydrate form of the calcium hydrogen phosphate exhibits the effect of increasing the strength of a gypsum hardened body.

Note that although the amount of calcium hydrogen phosphate dihydrate added is not particularly limited, a gypsum slurry preferably includes calcium hydrogen phosphate dihydrate at an amount greater than or equal to 0.01 parts by mass and less than or equal to 5 parts by mass with respect to 100 parts by mass of calcined gypsum. That is, upon preparing the gypsum slurry, calcium hydrogen phosphate dihydrate is preferably added at an amount greater than or equal to 0.01 parts by mass and less than or equal to 5 parts by mass with respect to 100 parts by mass of calcined gypsum. This is because when the amount of calcium hydrogen phosphate dihydrate added is less than 0.01 parts by mass with respect to 100 parts by mass of calcined gypsum, the strength of the gypsum hardened body may not be sufficiently increased from adding the calcium hydrogen phosphate dihydrate. Also, when the amount of calcium hydrogen phosphate dihydrate added is greater than 5 parts by mass with respect to 100 parts by mass of calcined gypsum, the purity of the gypsum hardened body may be degraded, and costs may be increased. In particular, the gypsum slurry more preferably includes calcium hydrogen phosphate dihydrate at an amount greater than or equal to 0.05 parts by mass and less than or equal to 1 part by mass with respect to 100 parts by mass of calcined gypsum.

Although the method for adding calcium hydrogen phosphate dihydrate is not particularly limited, for example, calcium hydrogen phosphate dihydrate may be mixed with calcined gypsum in advance to obtain a gypsum composition, and the resulting gypsum composition may be mixed with water and foam to form a gypsum slurry. Alternatively, calcium hydrogen phosphate dihydrate may be suspended in water, and calcined gypsum, the suspended solution of calcium hydrogen phosphate dihydrate and water, and foam may be mixed together to form a gypsum slurry, for example.

Also, upon conducting further investigations, the inventors of the present invention have discovered that by adding calcium hydrogen phosphate dihydrate, deflection of the gypsum hardened body can be suppressed and dimensional stability can be improved. In the following, the effects of suppressing deflection and improving dimensional stability of a gypsum hardened body by adding calcium hydrogen phosphate dihydrate will be described.

As described above, in recent years, there is an increasing demand for a lightweight gypsum hardened body with a low specific gravity for the purpose of improving workability and ease of handling. In particular, there is a demand for a gypsum hardened body with a low specific gravity that can be used in applications such as a ceiling board, for example. Specifically, there is a demand for a gypsum hardened body with a low specific gravity that can be used in a gypsum panel (e.g. gypsum board) that includes the gypsum hardened body as its core material, for example.

A ceiling board generally has a plurality of screws arranged at intervals along its peripheral edge such that the ceiling board may be fixed to fasteners of a ceiling by the screws. However, when a gypsum panel including a conventional lightweight gypsum hardened body with a low specific gravity is used, deflection may occur at the gypsum panel in between the screws, and the appearance of the gypsum panel may be compromised.

On the other hand, by using the gypsum hardened body obtained by adding calcium hydrogen phosphate dihydrate according to the present embodiment, deflection of the gypsum panel may be substantially suppressed as compared with the case of using the conventional gypsum hardened body having no calcium hydrogen phosphate dihydrate added thereto, and issues with regard to the appearance of the gypsum panel may be resolved. Although the reason why deflection can be suppressed by adding calcium hydrogen phosphate dihydrate to a gypsum hardened body is not clear, the suppressing effect is presumably related to the strengthening effect on the gypsum hardened body as described above and the effect of improving dimensional stability of the gypsum hardened body as described below.

As described above, the occurrence of deflection is particularly problematic when a gypsum hardened body is used in a gypsum panel. However, by using the gypsum hardened body according to the present embodiment in a gypsum panel, the occurrence of deflection can be substantially reduced. That is, the gypsum hardened body according to the present embodiment can exhibit advantageous effects particularly in the case where it is used as the core material of a gypsum board. Note that although a gypsum panel including the gypsum hardened body according to the present embodiment as its core material is not particularly limited, for example, the gypsum panel may be a gypsum board.

Also, as described above, by adding calcium hydrogen phosphate dihydrate to a gypsum hardened body, the dimensional stability of the gypsum hardened body can be improved.

For example, it is known that when a gypsum hardened body is placed in a high-humidity environment, such as a near-water environment, the gypsum hardened body expands by absorbing moisture and undergoes a dimensional change. When the gypsum hardened body undergoes such dimensional change, a force is applied to the gypsum hardened body and surrounding members thereof, and as a result, problems such as cracking and expansion of the gypsum hardened body and its surrounding members are likely to occur. However, by adding calcium hydrogen phosphate dihydrate to the gypsum hardened body according to the present embodiment, dimensional changes in the gypsum hardened body can be substantially suppressed even when the gypsum hardened body is placed in a high-humidity environment. That is, the swelling ratio of the gypsum hardened body can be reduced. Accordingly, the gypsum hardened body according to the present embodiment can be used even in a high-humidity environment, for example.

In the following, the water added in preparing the gypsum slurry is described. The gypsum hardened body according to the present embodiment is obtained by hardening a gypsum slurry as described above. Because the gypsum slurry is prepared by mixing calcined gypsum and calcium hydrogen phosphate dihydrate, for example, water can be added to the gypsum slurry. The amount of water added in forming the gypsum slurry is not particularly limited and may be adjusted to a suitable amount according to the required fluidity, for example.

Also, when forming the gypsum slurry, foam may be added to the gypsum slurry. By adjusting the amount of foam added to the gypsum slurry, the specific gravity of the resulting gypsum hardened body can be adjusted to a desired range.

The method for adding the foam when forming the gypsum slurry is not particularly limited and any method may be used. For example, a foaming agent may be added to water (water for foaming), and a foam (bubbles) may be formed by incorporating air while stirring the water mixture. By mixing the resulting foam with calcined gypsum, calcium hydrogen phosphate dihydrate, and water (water for gypsum slurry), a gypsum slurry with foam added thereto may be formed. Alternatively, a gypsum slurry may be formed in advance by mixing calcined gypsum, calcium hydrogen phosphate dihydrate, and water, for example, and a foam that has be formed may be added to the gypsum slurry to obtain the gypsum slurry with the foam added thereto.

Although there is no particular limitation on the foaming agent used in forming the foam, for example, alkyl sodium sulfate, alkyl ether sulfate, sodium alkylbenzenesulfonate, or polyoxyethylene alkyl sulfates may be used.

Also, the amount of foam added is not particularly limited and may be arbitrarily selected depending on the specific gravity required for the gypsum hardened body.

The specific gravity of the gypsum hardened body according to the present embodiment is not particularly limited but is preferably greater than or equal to 0.3 and less than or equal to 0.8. Thus, the amount of foam to be added is preferably selected such that the specific gravity of the gypsum hardened body falls within the above range. Also, because the strength of the gypsum hardened body according to the present embodiment can be increased by adding calcium hydrogen phosphate dihydrate as described above, the gypsum hardened body according to the present embodiment may exhibit advantageous effects particularly when used in a gypsum board with a low specific gravity and low strength, for example. Therefore, the specific gravity of the gypsum hardened body according to the present embodiment is more preferably greater than or equal to 0.3 and less than or equal to 0.7, and more preferably greater than or equal to 0.3 and less than or equal to 0.5. In the case where the specific gravity of the gypsum hardened body is to be within the above-mentioned ranges, the amount of foam to be added is preferably adjusted such that the specific gravity of the gypsum hardened body falls within the above ranges.

Also, note that components other than calcium hydrogen phosphate dihydrate, water, and foam as described above may be added to the gypsum slurry gypsum.

Specifically, for example, an organic carboxylic acid and/or an organic carboxylic acid salt may also be added to the gypsum slurry gypsum.

Organic carboxylic acids and/or organic carboxylic acid salts have the function of increasing the dimensional stability of the gypsum hardened body. As described above, by adding calcium hydrogen phosphate dihydrate to the gypsum slurry, the dimensional stability of the resulting gypsum hardened body may be improved. Moreover, a synergistic effect of improving the dimensional stability may be achieved by adding calcium hydrogen phosphate dihydrate and an organic carboxylic acid and/or an organic carboxylic acid salt at the same time, such an effect being substantially greater than the case where only the former or the latter is added.

The type of organic carboxylic acid and/or organic carboxylic acid salt to be added is not limited to a particular type and may be arbitrarily selected. For example, the type of organic carboxylic acid to be added preferably includes one or more types of organic carboxylic acids selected from the group consisting of formic acid, acetic acid, propionic acid, butyric acid, valeric acid, acrylic acid, methacrylic acid, propiolic acid, oleic acid, maleic acid, fumaric acid, oxalic acid, malonic acid, succinic acid, glutaric acid, adipic acid, tartaric acid, citric acid, malic acid, gluconic acid, and lactic acid. Further, the type of organic carboxylic acid salt to be added preferably includes one or more salts of one or more organic carboxylic acids selected from the group consisting of formic acid, acetic acid, propionic acid, butyric acid, valeric acid, acrylic acid, methacrylic acid, propiolic acid, oleic acid, maleic acid, fumaric acid, oxalic acid, malonic acid, succinic acid, glutaric acid, adipic acid, tartaric acid, citric acid, malic acid, gluconic acid, and lactic acid.

The amount of the organic carboxylic acid and/or organic carboxylic acid salt to be added to the gypsum slurry is not particularly limited but, for example, the organic carboxylic acid and/or organic carboxylic acid salt is preferably added such that the gypsum slurry contains the organic carboxylic acid and/or organic carboxylic acid salt at an amount greater than or equal to 0.005 parts by mass and less than or equal to 0.2 parts by mass with respect to 100 parts by mass of calcined gypsum. In particular, the organic carboxylic acid and/or organic carboxylic acid salt is more preferably added such that the gypsum slurry contains the organic carboxylic acid and/or organic carboxylic acid salt at an amount greater than or equal to 0.01 parts by mass and less than or equal to 0.1 parts by mass with respect to 100 parts by mass of calcined gypsum.

Also, note that components other than those described above may also be added to the gypsum slurry. For example, starch; an adhesion improver, such as polyvinyl alcohol, for improving adhesion between the gypsum hardened body and a material being covered; inorganic fibers, such as glass fibers and lightweight aggregates; refractory materials, such as vermiculite; coagulation adjusting agents; setting accelerators; water reducing agents; bubble diameter adjusting agents, such as a sulfosuccinic acid salt surfactant; water repellent agents, such as silicone or paraffin; and other various types of additives conventionally added to the raw material of a gypsum hardened body may also be added. Also, a known strengthening agent other than calcium hydrogen phosphate dihydrate may be added as well.

Note that the additives that may be optionally added to the gypsum slurry may be added at arbitrary timings upon preparing the gypsum slurry. For example, one or more of the optional additives described above may be mixed with calcined gypsum and, in some cases, calcium hydrogen phosphate dihydrate to form a gypsum composition, and the resulting gypsum composition may be mixed with water and foam to form the gypsum slurry. Alternatively, one or more of the optional additives, calcined gypsum, calcium hydrogen phosphate dihydrate, water, and foam may all be mixed together to form the gypsum slurry, for example.

In the following, the gypsum hardened body that is produced by hardening the gypsum slurry obtained by mixing together the above components is described.

The gypsum hardened body according to the present embodiment is obtained by causing the calcined gypsum (hemihydrate gypsum) in the above-described gypsum slurry to set and solidify by forming acicular crystals of dihydrate gypsum through a hydration reaction. A hardened gypsum body with a desired shape can be obtained by shaping the gypsum slurry into the desired shape before it solidifies.

The hardened gypsum body according to the present embodiment may have any desired shape. For example, when the hardened gypsum is used for a building material, the hardened gypsum may be formed into a panel or a block. Also, the gypsum slurry may be formed into putty by adjusting its viscosity such that it may be used as a joint filler material that is filled into a gap between members and hardened thereafter. That is, the hardened gypsum body may be formed into a shape corresponding to the gap between the members.

Also, the gypsum hardened body according to the present embodiment may be used in gypsum building materials including a gypsum hardened body. Although gypsum building materials including the gypsum hardened body according to the present embodiment is not particularly limited, for example, they may include panel-shaped gypsum building materials, block-shaped gypsum building materials, and gypsum building materials arranged into other shapes. However, because the gypsum hardened body according to the present embodiment has calcium hydrogen phosphate dihydrate added thereto as described above, it is capable of suppressing deflection. The occurrence of deflection becomes a problem particularly when a gypsum panel is used as a ceiling board, for example. Thus, the gypsum hardened body according to the present embodiment is suitably used in a gypsum panel including the gypsum hardened body as its core material.

Although the gypsum panel is not particularly limited to a specific type, examples of the gypsum panel include a gypsum board, a glass mat gypsum panel, a glass fiber nonwoven fabric embedded gypsum panel, and a slug gypsum panel. The gypsum panel may preferably be a gypsum board, which is widely used as a ceiling board.

Because calcium hydrogen phosphate dihydrate is added to the gypsum panel according to the present embodiment, deflection of the gypsum panel can be suppressed as described above. Although the deflection of the gypsum panel according to the present embodiment is not particularly limited, the deflection is preferably arranged to be less than or equal to 100 mm, and more preferably less than or equal to 75 mm, regardless of the thickness of the gypsum panel. Also, although the lower limit of the deflection of the gypsum panel according to the present embodiment is not particularly limited, because the deflection is preferably arranged to be as little as possible, the lower limit may be 0 mm, for example.

Figure 1:
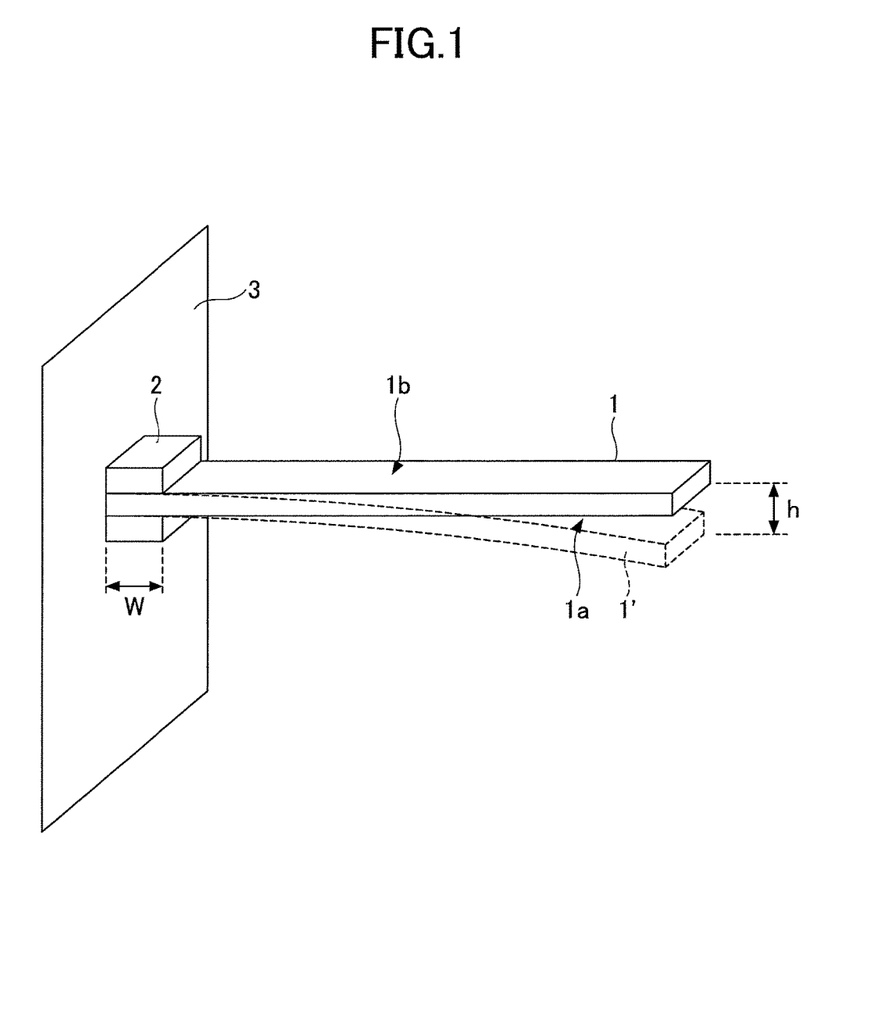
FIG. 1 illustrates a gypsum board according to an embodiment of the present invention.

Note that in the present descriptions, deflection refers to a value obtained by an evaluation method as described below with reference to FIG. 1. FIG. 1 is a perspective view schematically showing a state of performing a deflection test.

First, an evaluation gypsum panel 1 to be used as an evaluation sample is prepared by cutting the gypsum panel 1 into a sample that is 10 cm long and 50 cm wide.

Then, as shown in FIG. 1, one end of the long sides of the evaluation gypsum panel 1, i.e., one of the short sides of the evaluation gypsum panel 1, is fixed by a fastener 2. In this case, the fastener 2 fixes the evaluation gypsum panel 1 such that a surface 1a of the evaluation gypsum panel 1 is arranged to be horizontal, and the surface 1a faces downward while a rear face 1b faces upward. The other end of the long sides of the evaluation gypsum panel 1 is not fixed so that it can be displaced in the height direction by the weight of the evaluation gypsum panel 1.

Note that the fastener 2 is not limited to a particular configuration as long as it is capable of holding the evaluation gypsum panel 1 horizontally. For example, the fastener 2 may be configured to hold one end of the evaluation gypsum panel 1 from the upper side and the lower side as shown in FIG. 1. Also, as shown in FIG. 1, the fastener 2 may be configured to fix the evaluation gypsum panel 1 over a certain width W, such as a width of 50 mm from the one end of the long side of the evaluation gypsum panel 1. That is, the width W in FIG. 1 may be set to 50 mm, for example. Also, the fastener 2 may be mounted on a support member 3 having a vertical plane, such as a wall of a thermostatic chamber (thermostatic tank), for example.

Then, the evaluation gypsum panel 1 that has been fixed is left in an environment with a temperature of 40° C. and a relative humidity of 95% for 24 hours. After 24 hours, if deflection has occurred in the evaluation gypsum panel 1, the other end of the evaluation gypsum panel 1 that is not fixed by the fastener 2 may be displaced downward as represented by the dotted lines showing the evaluation gypsum panel 1' after 24 hours in FIG. 1. Thus, the displacement h in the height direction of the other end of the evaluation gypsum panel 1' that has been left in the environment with a temperature of 40° C. and a relative humidity of 95% is measured based on the position of the other end of the evaluation gypsum panel 1' that has been left in the above environment for 24 hours and the position of the other end of the evaluation gypsum panel 1 before being left in such environment for 24 hours. Such displacement h in the height direction, i.e., the displacement in the downward direction of the other end of the evaluation gypsum panel 1 opposite the end that is fixed by the fastener 2, represents the deflection occurring at the gypsum panel.

In the gypsum hardened body according to the present embodiment, even when the specific gravity of the gypsum hardened body is relatively low, both non-combustibility and an increase in strength can be achieved. Thus, the specific gravity of the gypsum hardened body according to the present embodiment is preferably arranged to be lower than that of a conventional gypsum hardened body. Although the specific gravity of the gypsum hardened body according to the present embodiment is not particularly limited, as described above, the specific gravity is preferably arranged to be greater than or equal to 0.3 and less than or equal to 0.8, more preferably greater than or equal to 0.3 and less than or equal to 0.7, and more preferably greater than or equal to 0.3 and less than or equal to 0.5, for example.

Thus, a gypsum panel using the gypsum hardened body according to the present embodiment as its core material may be a lightweight gypsum panel, and in particular, such a gypsum panel may be a lightweight gypsum board, for example.

As described above, the gypsum hardened body and the gypsum panel according to the present embodiment may be a gypsum hardened body and a gypsum panel that have a low specific gravity and contain calcium hydrogen phosphate dihydrate, which is an inorganic material, as a strengthening agent. In particular, because calcium hydrogen phosphate dihydrate is an inorganic material, a gypsum hardened body and a gypsum panel having a low specific gravity that can achieve both non-combustibility and an increase in strength can be provided.

Further, deflection can be prevented from occurring in the gypsum hardened body and the gypsum panel according to the present embodiment, and the dimensional stability of the gypsum hardened body and the gypsum panel may be improved.

(Method for Manufacturing Gypsum Hardened Body, Method for Manufacturing Gypsum Board)

In the following, a method for manufacturing a gypsum hardened body according to the present embodiment, and a method for manufacturing of gypsum board according to the present embodiment will be described. Note that features relating to the gypsum hardened body, the gypsum panel, and the gypsum board according to the present embodiment that are already described above may be omitted in the following descriptions.

The method for manufacturing a gypsum hardened body according to the present embodiment may include the following steps.

Gypsum slurry manufacturing step for manufacturing a gypsum slurry by mixing calcined gypsum, calcium hydrogen phosphate dihydrate, water, and foam.

Shaping step for shaping the gypsum slurry into a shaped body.

Hardening step for hardening the shaped body obtained in the shaping step to obtained the gypsum hardened body.

The specific gravity of the gypsum hardened body obtained by the hardening step may be greater than or equal to 0.3 and less than or equal to 0.8.

Also, the method for manufacturing a gypsum board according to the present embodiment may include the following steps.

Gypsum slurry manufacturing step for manufacturing a gypsum slurry by mixing calcined gypsum, calcium hydrogen phosphate dihydrate, water, and foam.

Shaping step for arranging the gypsum slurry between base paper and shaping the gypsum slurry into a shaped body.

Hardening step for hardening the shaped body obtained in the shaping step to obtain the gypsum hardened body.

The specific gravity of the gypsum hardened body obtained by the hardening step may be greater than or equal to 0.3 and less than or equal to 0.8.

The gypsum slurry manufacturing step is a process for manufacturing the gypsum slurry by mixing calcined gypsum, calcium hydrogen phosphate dihydrate, water, and foam as described above. The gypsum slurry manufacturing step may be performed in the same manner in both the method for manufacturing a gypsum hardened body and the method for manufacturing a gypsum board according to the present embodiment.

Note that in some embodiments, the calcium hydrogen phosphate dihydrate can be mixed with the calcined gypsum in advance to form a gypsum composition, and the resulting gypsum composition may be mixed with water and foam to form the gypsum slurry, for example. Also, the calcium hydrogen phosphate dihydrate may be suspended in water, and the suspended solution of water and calcium hydrogen phosphate dihydrate may be mixed with calcined gypsum and foam to form the gypsum slurry, for example.

Also, in the gypsum slurry manufacturing step, an organic carboxylic acid and/or an organic carboxylic acid salt may be added as described above. By adding an organic carboxylic acid and/or an organic carboxylic acid salt, the dimensional stability of the resulting gypsum hardened body may be improved.

Further, in the gypsum slurry manufacturing step, components other than the above-mentioned calcined gypsum, calcium hydrogen phosphate dihydrate, water, and foam may also be added. For example, starch; an adhesion improver, such as polyvinyl alcohol, for improving adhesion between the gypsum hardened body and the base paper; inorganic fibers, such as glass fibers, and lightweight aggregates; refractory materials, such as vermiculite; coagulation adjusting agents; setting accelerators; water reducing agents; bubble diameter adjusting agents, such as a sulfosuccinic acid salt surfactant; water repellent agents, such as silicone or paraffin, and other various types of additives conventionally added to the raw material of a gypsum hardened body may be added. Also, a known strengthening agent other than calcium hydrogen phosphate dihydrate may be added as well.

Note that the additives that may be optionally added to the gypsum slurry may be added at arbitrary timings upon preparing the gypsum slurry. For example, one or more of the optional additives described above may be mixed with calcined gypsum and, in some cases, calcium hydrogen phosphate dihydrate to form a gypsum composition, and the resulting gypsum composition may be mixed with water and foam to form the gypsum slurry. Alternatively, one or more of the optional additives, calcined gypsum, calcium hydrogen phosphate dihydrate, water, and foam may all be mixed together to form the gypsum slurry, for example.

Because the components used in the gypsum slurry manufacturing step and the preferred amounts of the components to be added have already been described above, such descriptions are hereby omitted.

For example, when manufacturing a gypsum hardened body, the shape of the shaped body formed by the shaping step is not particularly limited and can be in any shape. For example, in the shaping step, the gypsum slurry may be formed into a panel, a block, or some other shape. Moreover, the gypsum slurry may be formed into putty by adjusting the viscosity of the gypsum slurry such that it may be used as a joint filler material that is filled in a gap between members, for example. That is, the gypsum slurry can be formed into a shape corresponding that of the gap between the members.

Further, when manufacturing a gypsum board, the shaping step may include a step of arranging the gypsum slurry between base paper.

Figure 2:
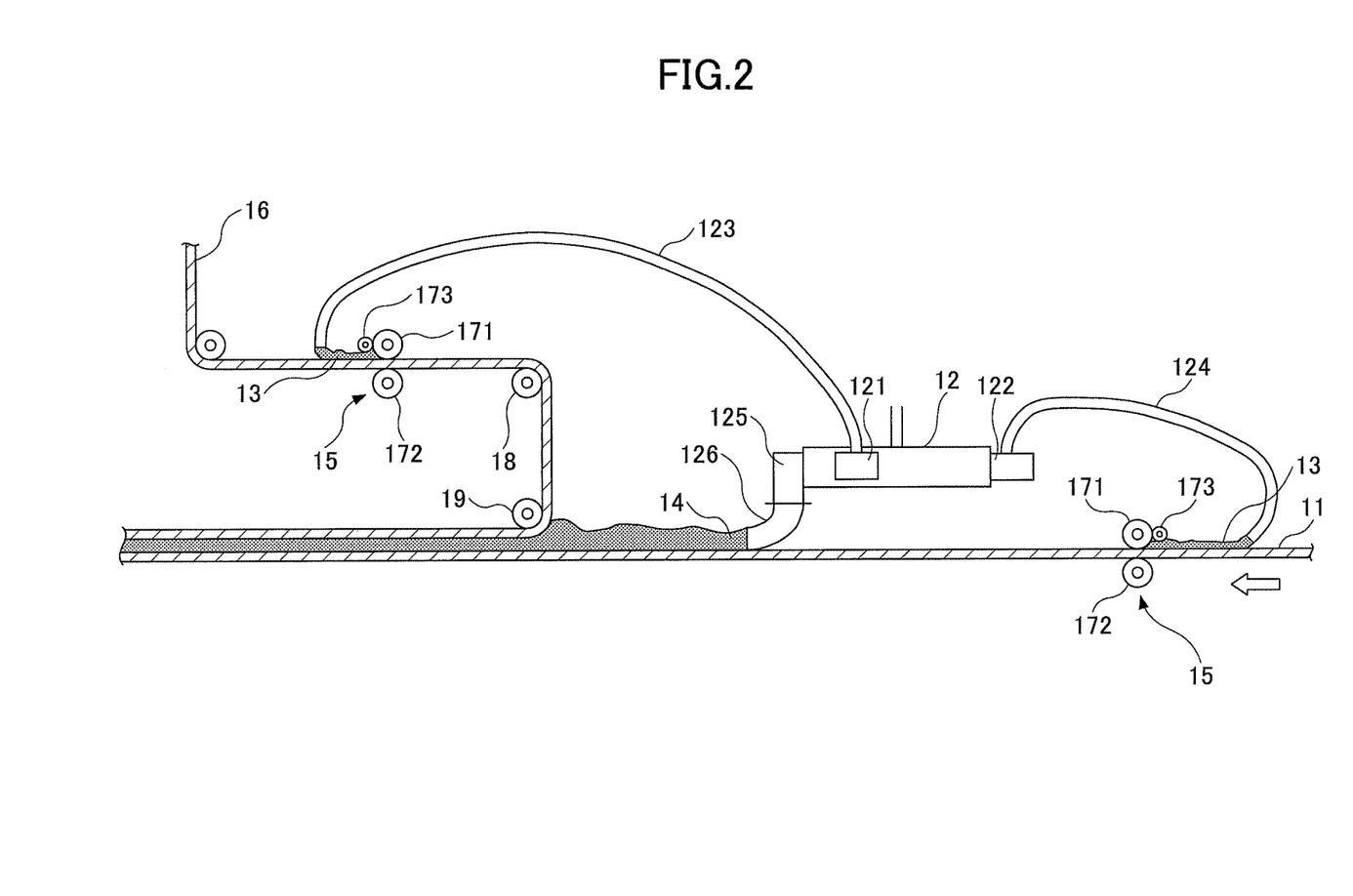
FIG. 2 illustrates a method for manufacturing a gypsum hardened body according to an embodiment of the present invention.

In the following, an example of the shaping step implemented in manufacturing a gypsum board is described with reference to FIG. 2. FIG. 2 is a partial and schematic side view of an apparatus for shaping a gypsum board.

Base paper (surface cover base paper) 11 corresponding to a surface material is conveyed along a production line from the right side to the left side of FIG. 2.

A mixer 12 may be arranged at a predetermined position relative to a conveyance line. For example, the mixer 12 may be arranged above or laterally relative to the conveyance line. Then, materials of the gypsum slurry including calcined gypsum, calcium hydrogen phosphate dihydrate, water, foam, and in some cases, an organic carboxylic acid and/or an organic carboxylic acid salt, and/or one or more additives are mixed in the mixer 12 to form the gypsum slurry. Examples of the additives that may be added include starch; an adhesion improver, such as polyvinyl alcohol, for improving adhesion between the gypsum hardened body and the base paper; inorganic fibers, such as glass fibers, and a lightweight aggregates; refractory materials, such as vermiculite; coagulation adjusting agents; setting accelerators; water reducing agents; bubble diameter adjusting agents, such as a sulfosuccinic acid salt surfactant; water repellent agents, such as silicone or paraffin, and other various types of additives conventionally added to raw materials of a gypsum hardened body. Also, a known strengthening agent other than calcium hydrogen phosphate dihydrate may be added as well.

Also, as described above, in some embodiments, solids such as calcined gypsum and calcium hydrogen phosphate dihydrate may be mixed in advance to form a gypsum composition, and the resulting gypsum composition may be mixed in the mixer 12, for example.

Further, foam may be added to the gypsum slurry from fractionation ports 121, 122, and/or 125. By adjusting the amount of foam added, the gypsum slurry may be arranged to have a desired density. For example, the fractionation ports 121 and 122 may be controlled to refrain from adding foam or add only a small amount of foam to prepare a high-density gypsum slurry 13. The fractionation port 125 may be controlled to add a larger amount of foam to prepare a low-density gypsum slurry 14.

Then, the resulting high-density gypsum slurry 13 is supplied onto the surface cover base paper 11 and back face cover base paper 16 through delivery pipes 123 and 124 at upstream sides of the conveying directions of roll coaters 15.

Note that rollers 171, 172, and 173 respectively correspond to an application roller, a receiving roller, and a residue removal roller. The high-density gypsum slurry 13 on the surface cover base paper 11 and the high-density gypsum slurry 13 on the back face cover base paper 16 reach spreading parts of the roll coaters 15 and are spread by such spreading parts. Both a thin layer of the high-density gypsum slurry 13 and a marginal region are formed on the surface cover base paper 11. Also, a thin layer of the high-density gypsum slurry 13 is similarly is formed-on the back face cover base paper 16.

The surface cover base paper 11 is conveyed without changing direction, and the back face cover base paper 16 is turned by a turning roller 18 to be conveyed in the conveyance line direction of the surface cover base paper 11. Then, both the surface cover base paper 11 and the back face cover base paper 16 reach a shaping machine 19. At this point, the low-density gypsum slurry 14 is supplied between the thin layers respectively formed on the surface cover base paper 11 and the back face cover base paper 16 from the mixer 12 via a pipeline 126. In this way, a continuous stacked body having a three-layer structure including the surface cover base paper 11, the low-density gypsum slurry 14, and the back face cover base paper 16 may be formed.

Note that FIG. 2 illustrates a case where gypsum slurries with a low density and a high density are manufactured by one mixer 12. However, in other examples, two mixers may be provided for supplying a high-density gypsum slurry and a low-density gypsum slurry.

Also, embodiments of the present invention are not limited to using a high-density gypsum slurry and a low-density gypsum slurry. For example, in some embodiments, a gypsum slurry in only one density may be manufactured and the resulting gypsum slurry may be supplied on the base paper.

Specifically, for example, a gypsum slurry with a predetermined density may be supplied to and deposited on the surface cover base paper (base paper) that is conveyed continuously. Under paper may be arranged along scores provided at the edge portions at both sides of the base paper so that the gypsum slurry is enclosed. At this time, the back face cover base paper (base paper for board) that is conveyed at the same speed may be superposed on the gypsum slurry. Then, the resulting layered structure may pass through a shaping machine for regulating the thickness and the width of the gypsum board. In this way, a gypsum board may be manufactured.

Note that although a gypsum board has been described above as an example, the base paper that is used as a surface material may be replaced with glass fiber nonwoven fabric (glass tissue) or a glass mat, for example. In this way, other types of gypsum panels having the surface material arranged on their surface or embedded into their surface may be manufactured, for example.

Next, the hardening step may be implemented. The hardening step involves hardening the shaped body obtained by the shaping step.

The hardening step is implemented by causing the calcined gypsum (hemihydrate gypsum) in the gypsum slurry to set and solidify by forming acicular crystals of dihydrate gypsum through a hydration reaction. That is, in both the method for manufacturing a gypsum hardened body and the method for manufacturing a gypsum board, the hardening step may be implemented by promoting a hydration reaction of calcined gypsum within the shaped body shaped by the shaping step by having the calcined gypsum react with water that has been added to the gypsum slurry.

Also, in the method for manufacturing a gypsum hardened body and the method for manufacturing a gypsum board according to the present embodiment, additional steps, such as a rough cutting step, a drying step, a cutting step, and/or a loading step may optionally be performed as necessary or desired.

For example, after the shaping step and during or after the hardening step, a rough cutting step may be performed to cut the shaped-body formed by the shaping step with a rough cutter. In the rough cutting step, the continuous shaped body formed by the shaping step may be cut into a predetermined length.

Also, a drying step may be performed on the shaped body formed by the shaping step or the shaped body cut by the rough cutting step. Note that as a result of performing the drying step, a shaped body that has been turned into a gypsum hardened body obtained by the hardening step may be provided. In the drying step, the shaped body is forcibly dried by a dryer to form the hardened gypsum body.

Although the method of drying the shaped body using a dryer is not limited to a particular method, for example, the dryer may be arranged on a conveying path for conveying the shaped body so that the shaped body may be passed through the dryer. In this way, the shaped body may be continuously dried. Alternatively, batches of the shaped bodies may be loaded in the dryer so that the shaped bodies may be dried in batches, for example.

Further, after drying the shaped body, for example, a cutting step may be performed to cut the hardened gypsum body into a product with a predetermined length. Also, a loading step may be performed for loading the gypsum hardened body or the gypsum board on a lifer and storing the gypsum hardened body or the gypsum board in a warehouse, or loading the gypsum hardened body or the gypsum board in a truck for shipping, for example.

In the method for manufacturing a gypsum hardened body and the method for manufacturing a gypsum board according to the present embodiment, a gypsum hardened body and a gypsum board that have a low specific gravity and includes calcium hydrogen phosphate dihydrate, which is an inorganic material, as a strengthening agent may be manufactured. In particular, because the calcium hydrogen phosphate dihydrate that is added to the gypsum slurry is an inorganic material, a gypsum hardened body and a gypsum board having a low specific gravity that can achieve both noncombustibility and an increase in strength may be provided.

Also, deflection can be prevented from occurring in the gypsum hardened body and the gypsum panel obtained by the method for manufacturing a gypsum hardened body and the method for manufacturing a gypsum board according to the present embodiment. Further, dimensional stability may be improved in the gypsum hardened body and the gypsum board obtained by the method for manufacturing a gypsum hardened body and the method for manufacturing a gypsum board according to the present embodiment.

PRACTICAL EXAMPLES

In the following specific practical examples are described. However, the present invention is not limited to these practical examples.

Experimental Example 1

In Experimental Example 1, gypsum hardened bodies having differing specific gravities, including gypsum hardened bodies having calcium hydrogen phosphate dihydrate added thereto and gypsum hardened bodies without calcium hydrogen phosphate dihydrate were prepared under the conditions described below, and their properties were evaluated.

First, methods for manufacturing the gypsum bodies of Experimental Example 1-1-1 through Experimental Example 1-1-6 and Experimental Example 1-2-1 through Experimental Example 1-2-6 will be explained.

Experimental Example 1-1-1 Through Experimental Example 1-1-6

In Experimental Example 1-1-1 through Experimental Example 1-1-6, gypsum hardened bodies having calcium hydrogen phosphate dihydrate added thereto were manufactured according to the following procedure.

Note that Experimental Example 1-1-1 through Experimental Example 1-1-6 are all practical examples of the present invention.

First, gypsum compositions were prepared by mixing 2 parts by mass of a setting accelerator and 0.5 parts by mass of calcium hydrogen phosphate dihydrate with 100 parts by mass of calcined gypsum (β-calcined gypsum). Then, gypsum slurries were prepared by adding 100 parts by mass of water with respect to 100 parts by mass of the calcined gypsum, and further adding a foam prepared by foaming a foaming agent (main component: alkyl ether sulfate) into the mixture.

As indicated in Table 1 shown below, in Experimental Example 1-1-1 through Experimental Example 1-1-6, samples of gypsum hardened bodies with specific gravities within a range from 0.3 to 0.8 were fabricated. In preparing the gypsum slurries for these samples, the amount of foam added was adjusted to achieve the predetermined specific gravity indicated for each of the above experimental examples in Table 1. For example, in preparing the gypsum slurry for Experimental Example 1-1-1, the amount of foam added was adjusted such that a gypsum hardened body with a specific gravity of 0.3 could be obtained.

Then, the prepared gypsum slurries were poured into a 2 cm×2 cm×2 cm mold, and after confirming that the gypsum slurries have hardened, the hardened gypsum slurries were removed from the mold and dried in a dryer set to 40° C. until they reached a constant weight.

Experimental Example 1-2-1 Through Experimental Example 1-2-6

In Experimental Example 1-2-1 through Experimental Example 1-2-6, gypsum hardened bodies were prepared in a manner similar to Experimental Example 1-1-1 through Experimental Example 1-1-6 except that no calcium hydrogen phosphate dihydrate was added in preparing the gypsum compositions. In these experimental examples, the amount of foam added were similarly adjusted in preparing the gypsum slurries so that the samples of Experimental Example 1-2-1 through Experimental Example 1-2-6 would have the predetermined specific gravities indicated in Table 1.

Note that Experimental Example 1-2-1 through Experimental Example 1-2-6 are all comparative examples.

In the following, evaluation methods used to evaluate the gypsum hardened bodies obtained in Experimental Examples 1-1-1 through Experimental Example 1-1-6 and Experimental Example 1-2-1 through Experimental Example 1-2-6 will be explained (Compressive Strength)

Figure 3:
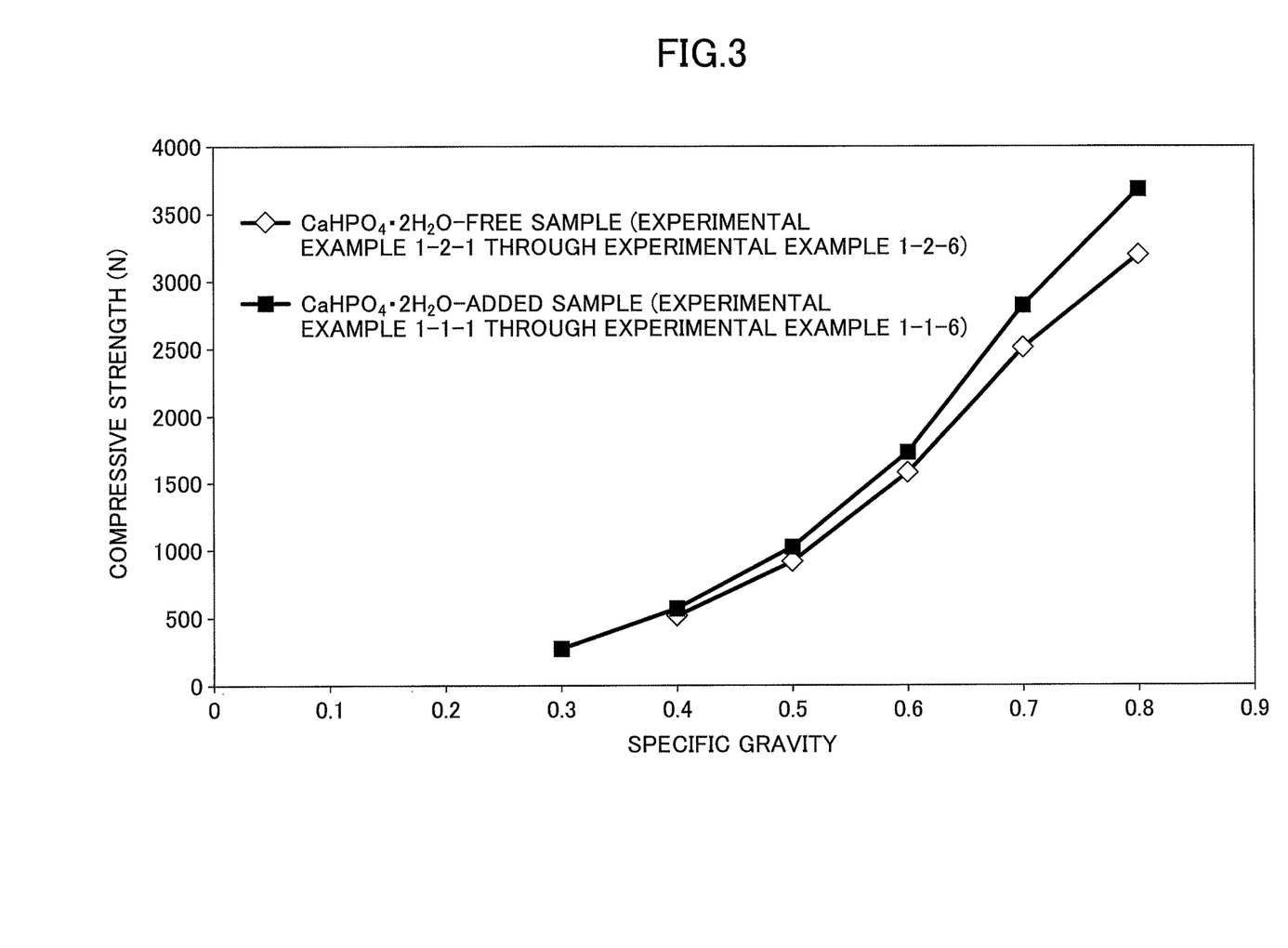
FIG. 3 is a graph indicating a relationship between the specific gravity and the compressive strength of gypsum hardened bodies obtained in Experimental Example 1.

The compressive strength of the gypsum hardened bodies arranged into 2 cm×2 cm×2 cm samples were measured using Autograph (manufactured by Shimadzu Corporation, model number: AG-10KNI). The load to be applied to the gypsum hardened bodies upon measurement was set to 3 mm/min. The results of the compressive strength tests are shown in Table 1 below. Also, FIG. 3 is a graph representing the results indicated in Table 1.

TABLE 1

|  | $CaHPO_4 \cdot 2H_2O$ (PART(S) BY MASS) | HARDENED BODY SPECIFIC GRAVITY | COMPRESSIVE STRENGTH (N) |
| --- | --- | --- | --- |
| EXPERIMENTAL EXAMPLE 1-1-1 | 0.5 | 0.3 | 274 |
| EXPERIMENTAL EXAMPLE 1-1-2 |  | 0.4 | 561 |
| EXPERIMENTAL EXAMPLE 1-1-3 |  | 0.5 | 1023 |
| EXPERIMENTAL EXAMPLE 1-1-4 |  | 0.6 | 1737 |
| EXPERIMENTAL EXAMPLE 1-1-5 |  | 0.7 | 2838 |
| EXPERIMENTAL EXAMPLE 1-1-6 |  | 0.8 | 3697 |
| EXPERIMENTAL EXAMPLE 1-2-1 | 0 | 0.3 | N/A |
| EXPERIMENTAL EXAMPLE 1-2-2 |  | 0.4 | 494 |
| EXPERIMENTAL EXAMPLE 1-2-3 |  | 0.5 | 913 |
| EXPERIMENTAL EXAMPLE 1-2-4 |  | 0.6 | 1580 |
| EXPERIMENTAL EXAMPLE 1-2-5 |  | 0.7 | 2524 |
| EXPERIMENTAL EXAMPLE 1-2-6 |  | 0.8 | 3214 |

With respect to the gypsum hardened bodies of Experimental Example 1-2-1 through Experimental Example 1-2-6 that do not have calcium hydrogen phosphate dihydrate added thereto, although the gypsum hardened body of Experimental Example 1-2-1 with a specific gravity of 0.3 could be removed from the mold, this sample could not maintain its shape due to substantial shrinking during the drying process. It can be appreciated from the above that the strength of the sample of Experimental Example 1-2-1 with a specific gravity of 0.3 is substantially low.

Referring to Table 1 and FIG. 3, by comparing the compressive strength measurements of samples having the same specific gravity and only differing in whether they contain calcium hydrogen phosphate dihydrate, it can be appreciated that the compressive strength of a gypsum hardened body can be increased by approximately 10% to 20% by adding calcium hydrogen phosphate dihydrate to the gypsum hardened body.

Experimental Example 2

In Experimental Example 2, gypsum hardened bodies containing different types of calcined gypsum at different ratios and also differing in whether they contain calcium hydrogen phosphate dihydrate were prepared under the conditions described below, and their properties were evaluated.

Note that Experimental Example 2-1 through Experimental Example 2-3 are practical examples of the present invention, and Experimental example 2-4 through Experimental Example 2-6 are comparative examples.

Experimental Example 2-1

In the present experimental example, only β-calcined gypsum was used as the calcined gypsum and calcium hydrogen phosphate dihydrate was added to prepare a gypsum hardened body.

Specifically, a gypsum composition was prepared by mixing 2 parts by mass of a setting accelerator and 0.5 parts by mass of calcium hydrogen phosphate dihydrate with 100 parts by mass of calcined gypsum (β-calcined gypsum). Then, a gypsum slurry was prepared by adding 100 parts by mass of water with respect to 100 parts by mass of calcined gypsum, and further adding a foam prepared by foaming a foaming agent (main component: alkyl ether sulfate) into the mixture. Note that the amount of foam added was adjusted to obtain a gypsum hardened body with a specific gravity of 0.5.

Then, the prepared gypsum slurry was poured into a 2 cm×2 cm×2 cm mold, and after confirming that the gypsum slurry has hardened, the hardened gypsum slurry was removed from the mold and dried in a dryer set to 40° C. until it reached a constant weight.

Then, as with Experimental Example 1, the compressive strength of the resulting gypsum hardened body sample was measured. The result of the measurement is shown in Table 2 below.

Experimental Example 2-2

Aside from using calcined gypsum including 90 parts by mass of β-calcined gypsum and 10 parts by mass of α-calcined gypsum, a gypsum hardened body sample was prepared in a manner similar to Experimental Example 2-1, and the resulting sample was evaluated. The result of the evaluation is shown in Table 2.

Experimental Example 2-3

Aside from using calcined gypsum comprising 100 parts by mass of α-calcined gypsum, that is, aside from using only α-calcined gypsum, a gypsum hardened body sample was prepared in a manner similar to Experimental Example 2-1, and the resulting sample was evaluated. The result of the evaluation is shown in Table 2.

Experimental Example 2-4 Through Experimental Example 2-6

Aside from not adding any calcium hydrogen phosphate dihydrate as indicated in Table 2, samples of Experimental Example 2-4 through Experimental Example 2-6 were prepared in a manner similar to Experimental Example 2-1 through Experimental Example 2-3, and the resulting samples were evaluated. The results of the evaluations are shown in Table 2.

TABLE 2

| | CALCINED GYPSUM (PART(S) BY WEIGHT) | | CaHPO$_4$·2H$_2$O (PART(S) BY MASS) | COMPRESSIVE STRENGTH (N) |
|---|---|---|---|---|
| | α | β | | |
| EXPERIMENTAL EXAMPLE 2-1 | 0 | 100 | 0.5 | 1023 |
| EXPERIMENTAL EXAMPLE 2-2 | 10 | 90 | | 870 |
| EXPERIMENTAL EXAMPLE 2-3 | 100 | 0 | | 572 |
| EXPERIMENTAL EXAMPLE 2-4 | 0 | 100 | 0 | 913 |
| EXPERIMENTAL EXAMPLE 2-5 | 10 | 90 | | 784 |
| EXPERIMENTAL EXAMPLE 2-6 | 100 | 0 | | 545 |

By comparing Experimental Example 2-3 and Experimental Example 2-6, it can be appreciated that in the case of using only α-calcined gypsum, the compressive strength of the gypsum hardened body can be increased by approximately 5% by adding calcium hydrogen phosphate dihydrate to the gypsum hardened body.

Meanwhile, by comparing Experimental Example 2-1 and Experimental Example 2-4, it can be appreciated that in the case of using only β-calcined gypsum, the compressive strength of the gypsum hardened body can be increased by approximately 12% by adding calcium hydrogen phosphate dihydrate to the gypsum hardened body. Also, by comparing Experimental Example 2-2 and Experimental Example 2-5, it can be appreciated that in the case of using calcined gypsum including 90 parts by mass of β-calcined gypsum, the compressive strength of the gypsum hardened body can be increased by approximately 11% by adding calcium hydrogen phosphate dihydrate to the gypsum hardened body.

As can be appreciated the above, the higher the content of β-calcined gypsum in the calcined gypsum used, the greater the increase in the compressive strength of the gypsum hardened body as a result of adding calcium hydrogen phosphate dihydrate.

Experimental Example 3

In Experimental Example 3, gypsum boards having gypsum hardened bodies as their core materials were prepared under the conditions and procedure described below. The gypsum hardened bodies used as the core materials had differing specific gravities and also differed in whether they contained calcium hydrogen phosphate dihydrate. The properties of gypsum boards were then evaluated.

First, the methods for manufacturing the gypsum boards of Experimental Example 3-1-1 through Experimental Example 3-1-7 and Experimental Example 3-2-1 through Experimental Example 3-2-7 will be explained.

Experimental Example 3-1-1 Through Experimental Example 3-1-7

Experimental Example 3-1-1 through Experimental Example 3-1-6 are practical examples of the present invention, and Experimental Example 3-1-7 is a comparative example.

The procedure for manufacturing the gypsum boards will be described below with reference to FIG. 2.

The base paper (surface cover base paper) 11 is continuously conveyed along the production line from the right side to the left side of FIG. 2. Note that the base paper including the surface cover base paper 11 and the back face cover base paper 16 used in the present experimental example were 200 g/m$^2$.

The mixer 12 is used to prepare a gypsum slurry, and the resulting gypsum slurry was supplied between the base paper. The mixer 12 may be arranged above the conveyance line as shown in FIG. 2 or laterally relative to the conveyance line. The mixer 12 is used to mix a gypsum composition and water to form the gypsum slurry (plaster). Note that the gypsum composition is prepared in advance by mixing 0.5 parts by mass of calcium hydrogen phosphate dihydrate, 2 parts by mass of a setting accelerator, and 0.5 parts by mass of an adhesion improver with 100 parts by mass of calcined gypsum (β-calcined gypsum). Also, upon preparing the gypsum slurry, 100 parts by mass of water and 0.3 parts by mass of a water reducing agent (naphthalenesulfonic acid) with respect to 100 parts by mass of the calcined gypsum included in the gypsum composition are added.

Then, the high-density gypsum slurry 13 having no foam added thereto is supplied onto the surface cover base paper 11 and back face cover base paper 16 through the delivery pipes 123 and 124 at upstream side of the conveying directions of the roll coaters 15.

The high-density gypsum slurry 13 on the surface cover base paper 11 and the high-density gypsum slurry 13 on the back face cover base paper 16 are spread out by spreading parts of the roll coaters 15 upon reaching the spreading parts. Both a thin layer of the high-density gypsum slurry 13 and a marginal region are formed on the surface cover base paper 11. Also, a thin layer of the high-density gypsum slurry 13 is similarly is formed on the back face cover base paper 16.

The surface cover base paper 11 is conveyed without changing direction, and the back face cover base paper 16 is turned by the turning roller 18 to be conveyed in the conveyance line direction of the surface cover base paper 11.

Then, both the surface cover base paper 11 and the back face cover base paper 16 reach the shaping machine 19. At this point, the low-density gypsum slurry 14 that is prepared by adding foam to the gypsum slurry is supplied between the thin layers respectively formed on the surface cover base paper 11 and the back face cover base paper 16 from the mixer 12 via the pipeline 126. Note that in each of the above experimental examples, foam was added to the low-density gypsum slurry 14 such that the resulting gypsum hardened body as a whole would have the gypsum hardened body specific gravity indicated in Table 3. Also, the foam was prepared by foaming a foaming agent (main component: alkyl ether sulfate).

Then, by passing through the shaping machine 19, the surface cover base paper 11, the low-density gypsum slurry 14, and the back face cover base paper 16 are formed into a continuous stacked body having a three-layer structure. Note that stacked body was shaped so that the thickness of the gypsum board would be 9.5 mm.

The stacked body that has been shaped hardens and reaches a rough cutter (not shown). The rough cutter cuts the continuous stacked body into a panel body with a predetermined length. In this way, a panel body having a core material primarily made of gypsum that is covered by base paper may be formed. That is, a semi-finished product of the gypsum board may be formed.

The stacked body cut by the rough cutter further passes through a dryer (not shown) to be forcibly dried by removing excess water. Then, the dried body is cut into a product with a predetermined length to manufacture the gypsum board.

Experimental Example 3-2-1 Through Experimental Example 3-2-7

Aside from not adding any calcium hydrogen phosphate dihydrate in preparing the gypsum compositions, gypsum hardened bodies of the present experimental examples were prepared in a manner similar to Experimental Example 3-1-1 through Experimental Example 3-1-7. Also, in the present experiment examples, upon preparing the low-density gypsum slurry 14, the amount of foam added was adjusted such that the gypsum hardened bodies in the samples of Experimental Example 3-2-1 through Experimental Example 3-2-7 would have the corresponding gypsum hardened boy specific gravities indicated in Table 3.

fastener 2 was set up to fix the one end of the evaluation gypsum board 1 over a width range W of 50 mm.

Then, the evaluation gypsum board 1 that has been fixed was left in an environment with a temperature of 40° C. and a relative humidity of 95% for 24 hours. After 24 hours, the displacement h in the height direction of the other end of the evaluation gypsum panel 1' that has been left for 24 hours (the displacement in the downward direction of the other end opposite the fixed end) was measured. Such displacement h in the height direction represents the deflection occurring at the gypsum board. The test result obtained for each sample is indicated in Table 3 below.

(Heat Release Test)

A heat release test (fire test) was conducted in accordance with JIS A 6901:2009 and the total heat release and the maximum heat release rate during a heating time of 20 minutes were measured. This test was carried out for Experimental Example 3-1-3 and Experimental Example 3-2-3. The test results are indicated in Table 3 below.

TABLE 3

| | $CaHPO_4 \cdot 2H_2O$ (PART(S) BY MASS) | GYPSUM HARDENED BODY SPECIFIC GRAVITY | COMPRESSIVE STRENGTH (N) | DEFLECTION (mm) | FIRE TEST | |
|---|---|---|---|---|---|---|
| | | | | | TOTAL HEAT RELEASE (MJ/m$^2$) | MAXIMUM HEAT RELEASE RATE (kW/m$^2$) |
| EXPERIMENTAL EXAMPLE 3-1-1 | 0.5 | 0.3 | 623 | 75 | | |
| EXPERIMENTAL EXAMPLE 3-1-2 | | 0.4 | 760 | 55 | | |
| EXPERIMENTAL EXAMPLE 3-1-3 | | 0.5 | 933 | 40 | 4.6 | 73 |
| EXPERIMENTAL EXAMPLE 3-1-4 | | 0.6 | 1588 | 28 | | |
| EXPERIMENTAL EXAMPLE 3-1-5 | | 0.7 | 2352 | 17 | | |
| EXPERIMENTAL EXAMPLE 3-1-6 | | 0.8 | 3775 | 15 | | |
| EXPERIMENTAL EXAMPLE 3-1-7 | | 0.9 | 4653 | 15 | | |
| EXPERIMENTAL EXAMPLE 3-2-1 | 0 | 0.3 | N/A | N/A | | |
| EXPERIMENTAL EXAMPLE 3-2-2 | | 0.4 | 674 | 141 | | |
| EXPERIMENTAL EXAMPLE 3-2-3 | | 0.5 | 804 | 120 | 4.7 | 74 |
| EXPERIMENTAL EXAMPLE 3-2-4 | | 0.6 | 1345 | 91 | | |
| EXPERIMENTAL EXAMPLE 3-2-5 | | 0.7 | 2223 | 76 | | |
| EXPERIMENTAL EXAMPLE 3-2-6 | | 0.8 | 3171 | 45 | | |
| EXPERIMENTAL EXAMPLE 3-2-7 | | 0.9 | 4124 | 31 | | |

Note that Experimental Example 3-2-1 through Experimental Example 3-2-7 are comparative examples.

In the following, evaluation methods for evaluating the resulting gypsum boards will be described.

(Compressive Strength)

A center portion of a gypsum board that has been manufactured was cut into 4 cm×4 cm samples, and four pieces of the cut gypsum board sample were stacked one on top of the other as a test sample.

The test sample was measured in a manner similar to Experimental Example 1. Specifically, the test sample was measured using Autograph (manufactured by Shimadzu Corporation, model number: AG-10KNI), and the load rate of Autograph was set to 3 mm/min. The resulting compressive strength measurements are shown in Table 3 below.

(Deflection Test)

A deflection test was conducted according to the procedure described above with reference to FIG. 1.

Specifically, an evaluation gypsum board 1 to be used as an evaluation sample was prepared by cutting the gypsum panel 1 to be 10 cm long and 50 cm wide. Then, one end of the long sides of the evaluation gypsum board 1 was fixed by a fastener 2 such that the surface 1a of the evaluation gypsum board 1 may be horizontal, and the surface 1a faces downward while the rear face 1b faces upward. Note that the Among the gypsum boards of Experimental Example 3-2-1 through Experimental Example 3-2-7 that do not contain calcium hydrogen phosphate dihydrate, the gypsum board of Experimental Example 3-2-1 with a specific gravity of 0.3 was unable to maintain it shape due to shrinking during the drying process. It can be appreciated from the above that the strength of the gypsum hardened body with a specific gravity of 0.3 used in the gypsum board of Experimental Example 3-2-1 as a core material is particularly low.

As shown in Table 3, by comparing the compressive stress measurements of gypsum board samples having the same specific gravity and only differing in whether they contain calcium hydrogen phosphate dihydrate, it can be appreciated that the compressive strength of a gypsum hardened body can be increased by approximately 10% to 20% by adding calcium hydrogen phosphate dihydrate to the gypsum hardened body.

Also, it can be appreciated that the amount of deflection can be reduced by adding calcium hydrogen phosphate dihydrate to the gypsum hardened body.

Note, however, that the effect of suppressing deflection of a gypsum hardened body by adding calcium hydrogen phosphate dihydrate tends to become smaller as the specific gravity of the gypsum hardened body increases, and the deflection suppressing effect plateaus at a specific gravity of around 0.9. Thus, the effect of suppressing deflection by adding calcium hydrogen phosphate dihydrate may particularly be exhibited in a gypsum hardened body with a relatively low specific gravity, such as a gypsum body with a specific gravity less than 0.9, for example.

Note that the effect of suppressing deflection by adding calcium hydrogen phosphate dihydrate can be calculated by obtaining the difference in the deflections of samples having the same specific gravity and only differing in whether they contain calcium hydrogen phosphate dihydrate (e.g., samples of Experimental Example 3-1-2 and Experimental Example 3-2-2).

Further, as shown in Table 3, upon conducting a heat release test (fire test) on the sample of Experimental Example 3-1-3 that contains calcium hydrogen phosphate dihydrate, the total heat release and the maximum heat release rate during a heating time of 20 minutes obtained for the sample of Experimental Example 3-1-3 were about the same as those obtained for the sample of Experimental Example 3-2-3 that does not contain calcium hydrogen phosphate dihydrate. Also, for the gypsum board sample of Experimental Example 3-1-3, the total heat release during a heating time of 20 minutes was less than 8 MJ/m$^2$, and the maximum heat release rate was less than 200 kW/m$^2$. As such, it could be confirmed that a through hole would not be formed in the gypsum board sample of Experimental Example 3-1-3 within the heating time of the heat release test. In other words, even when calcium hydrogen phosphate dihydrate is added, non-combustibility of the gypsum board can be maintained, and the gypsum board sample of Experimental Example 3-1-3 satisfies the Grade 1 heat release standard prescribed by JIS A 6901:2009.

Experimental Example 4

Experimental Example 4-1 Through Experimental Example 4-8

In Experimental Example 4, gypsum boards having gypsum hardened bodies as their core materials were prepared by the following procedure. The gypsum hardened bodies used as the core materials had differing amounts of calcium hydrogen phosphate dihydrate added thereto. The resulting gypsum boards were then evaluated.

In Experimental Example 4-1 through Experimental Example 4-8, the amount of calcium hydrogen phosphate dihydrate added in preparing the gypsum composition for each of the experimental examples was adjusted to the corresponding amount indicated in Table 4 below, and in preparing the low-density gypsum slurry 14, the amount of foam added to the gypsum slurry was adjusted such that the resulting gypsum hardened body as whole would have a specific gravity of 0.5. Aside from the above, the gypsum boards of the present experimental examples were prepared in a manner similar to Experimental Example 3.

In Table 4, Experimental Examples 4-2 through Experimental Example 4-8 are practical examples of the present invention, and Experimental Example 4-1 is a comparative example.

Note that the method used to manufacture the gypsum boards of the present experimental examples is substantially identical to the method described above in connection with Experimental Example 3, and as such, a description thereof is omitted.

The resulting gypsum boards were each subjected to a compressive strength test and a deflection test. The compressive strength test and the deflection test were conducted in the same manner as Experimental Example 3, and as such, descriptions thereof are also omitted.

Figure 4:
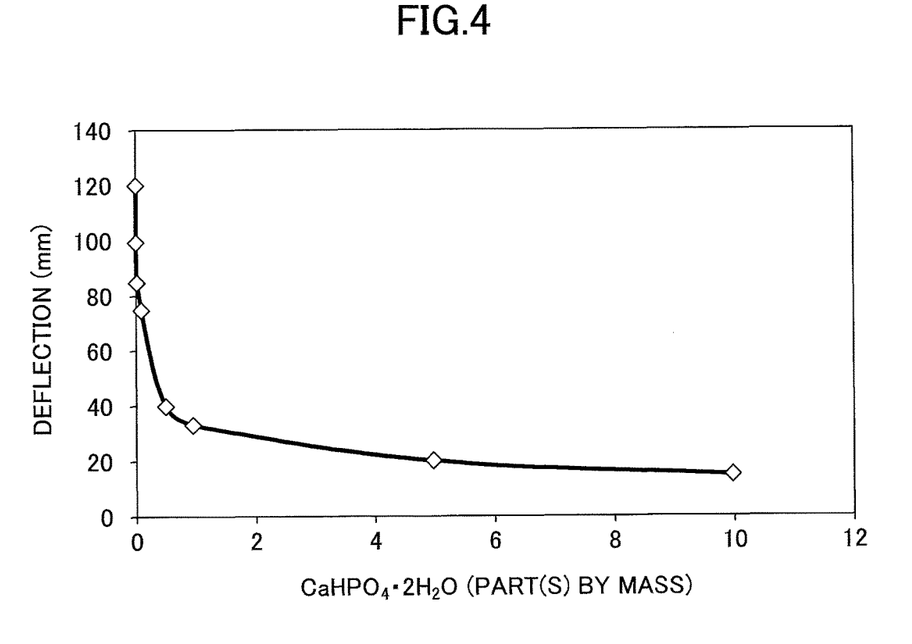
FIG. 4 is a graph indicating a relationship between the amount of calcium hydrogen phosphate dihydrate added and the amount of deflection of gypsum hardened bodies obtained in Experimental Example 4.

The test results obtained from the gypsum boards are indicated in Table 4 below. Also, FIG. 4 is a graph representing variations in the amount of deflection depending on the amount of calcium hydrogen phosphate dihydrate added.

TABLE 4

|  | EXPERIMENTAL EXAMPLE 4-1 | EXPERIMENTAL EXAMPLE 4-2 | EXPERIMENTAL EXAMPLE 4-3 | EXPERIMENTAL EXAMPLE 4-4 | EXPERIMENTAL EXAMPLE 4-5 | EXPERIMENTAL EXAMPLE 4-6 | EXPERIMENTAL EXAMPLE 4-7 | EXPERIMENTAL EXAMPLE 4-8 |
|---|---|---|---|---|---|---|---|---|
| CaHPO$_4$·2H$_2$O (PART(S) BY MASS) | 0 | 0.01 | 0.05 | 0.1 | 0.5 | 1 | 5 | 10 |
| COMPRESSIVE STRENGTH (N) | 768 | 808 | 815 | 828 | 933 | 960 | 1015 | 1035 |
| DEFLECTION (mm) | 120 | 99 | 85 | 75 | 40 | 33 | 20 | 15 |

It can be appreciated from Table 4 that an increase in compressive strength and the effect of suppressing deflection can be achieved by adding calcium hydrogen phosphate dihydrate at an amount greater than or equal to 0.01 parts by mass. In particular, as the amount of calcium hydrogen phosphate dihydrate added is increased, the compressive strength is increased and the amount of deflection is decreased. Also, it can be appreciated from FIG. 4 that the amount of deflection decreases as the amount of calcium hydrogen phosphate dihydrate added is increased. However, once the amount of calcium hydrogen phosphate dihydrate reaches 5 parts by mass, the amount of deflection does not substantially change even when calcium hydrogen phosphate dihydrate is added at a greater amount than 5 parts by mass (i.e., even when calcium hydrogen phosphate dihydrate is added at an amount exceeding 5% of the amount of calcined gypsum). Based on the above, the amount of calcium hydrogen phosphate dihydrate to be added is preferably arranged to be less than or equal to 5 parts by mass with respect to 100 parts by mass of calcined gypsum.

Experimental Example 5

In Experimental Example 5, gypsum boards having gypsum hardened bodies as core materials were prepared by the following procedure. The gypsum hardened bodies used as the core materials had differing amounts of calcium hydrogen phosphate dihydrate and tartaric acid added thereto. The resulting gypsum boards were then evaluated.

In the present experimental examples, gypsum compositions including 100 parts by mass of β-calcined gypsum, the respective amounts of calcium hydrogen phosphate dihydrate and tartaric acid indicated in Table 5 below, 2 parts by mass of a setting accelerator, and 0.5 parts by mass of an adhesion improver were used. Also, in preparing the low-density gypsum slurry 14, the amount of foam added to the gypsum slurry was adjusted such that the resulting gypsum hardened body would have a specific gravity of 0.5. Aside from the above, the gypsum boards of the present experimental examples were prepared in a manner similar to Experimental Example 3.

In Table 5, Experimental Example 5-3 through Experimental Example 5-8 are practical examples of the present invention, and Experimental Example 5-1 and Experimental Example 5-2 are comparative examples.

Because the method used to manufacture the gypsum boards of the present experimental examples is substantially the same as the method used in Experimental Example 3, a description thereof will be omitted.

The resulting gypsum boards were each subjected to a deflection test, a swelling test, and a compressive strength test. The deflection test and the compressive strength test were conducted in the same manner as Experimental Example 3, and as such, descriptions thereof are omitted.

As for the swelling test, first, the gypsum board that has been prepared was cut into a sample that is 5 cm and 30 cm wide, and acrylic plates were attached to both ends of the long sides of the cut gypsum board sample. Tips of a dial gauge were fixed to the acrylic plates so that the length of the long sides could be measured. Note that the long side length at this time (i.e., before the swelling test is conducted) may simply be referred to as the "long side length". Then, the gypsum board was placed in a container holding water at 20° C., and a portion of the gypsum board extending approximately 5 mm from one long side end of the gypsum board was arranged to be immersed in the water. The gypsum board was left in such a state for 24 hours. Then, the length of the long sides of the gypsum board after being partially immersed in water for 24 hours (long side length after 24 hours) was measured, and the swelling ratio was calculated using the following equation.

Swelling ratio (%)=(long side length after 24 hours−long side length)/long side length The evaluation results obtained for the samples of the present experimental examples are indicated in Table 5 below.

mass, the swelling ratio can still be reduced. Note that a decrease in the swelling ratio signifies an improvement in the dimensional stability of the gypsum-hardened body.

Also, upon comparing Experimental Example 5-3 and Experimental Example 5-8, it can be appreciated that the swelling ratio obtained for the sample of Experimental Example 5-3 that does not contain tartaric acid and the swelling ratio obtained for the sample of Experimental Example 5-8 that contains tartaric acid are both 0.18%. However, the amount of deflection measured for the sample of Experimental Example 5-8 is substantially smaller than that for the sample of Experimental Example 5-3.

Experimental Example 6

In Experimental Example 6, gypsum boards having gypsum hardened bodies as core materials were prepared by the following procedure. The gypsum hardened bodies used as the core materials had differing amounts of an organic carboxylic acid or an organic carboxylic acid salt added thereto. The resulting gypsum boards were then evaluated.

In the present experimental examples, gypsum compositions including 100 parts by mass of β-calcined gypsum, 0.5 parts by mass of calcium hydrogen phosphate dihydrate, 0.05 parts by mass of one substance selected from a group consisting of tartaric acid, citric acid, and succinic acid as indicated in Table 6 below, 2 parts by mass of a setting accelerator, and 0.5 parts by mass of an adhesion improver were used. Further, in preparing the low-density gypsum slurry 14, the amount of foam added to the gypsum slurry was adjusted such that the resulting gypsum hardened body would have a specific gravity of 0.5. Aside from the above, the gypsum boards of the present experimental examples were prepared in a manner similar to Experimental Example 3.

In Table 6, Experimental Example 6-1 through Experimental Example 6-3 are all practical examples of the present invention.

Because the method used to manufacture the gypsum boards of the present experimental examples is substantially the same as the method used in Experimental Example 3, a description thereof will be omitted.

TABLE 5

| | EXPERIMENTAL EXAMPLE 5-1 | EXPERIMENTAL EXAMPLE 5-2 | EXPERIMENTAL EXAMPLE 5-3 | EXPERIMENTAL EXAMPLE 5-4 | EXPERIMENTAL EXAMPLE 5-5 | EXPERIMENTAL EXAMPLE 5-6 | EXPERIMENTAL EXAMPLE 5-7 | EXPERIMENTAL EXAMPLE 5-8 |
|---|---|---|---|---|---|---|---|---|
| $CaHPO_4 \cdot 2H_2O$ (PART(S) BY MASS) | 0 | 0 | 0.5 | 0.5 | 0.5 | 0.5 | 0.5 | 0.5 |
| TARTARIC ACID (PART(S) BY MASS) | 0 | 0.05 | 0 | 0.005 | 0.01 | 0.05 | 0.1 | 0.2 |
| DEFLECTION (mm) | 120 | 65 | 40 | 35 | 28 | 22 | 15 | 15 |
| SWELLING RATIO (%) | 0.30 | 0.24 | 0.18 | 0.10 | 0.09 | 0.08 | 0.08 | 0.18 |
| COMPRESSIVE STRENGTH (N) | 768 | 812 | 933 | 957 | 949 | 921 | 925 | 911 |

Referring to Table 5, upon comparing the evaluation results of Experimental Example 5-3 through Experimental Example 5-7, for example, it can be appreciated that by adding tartaric acid in addition to adding calcium hydrogen phosphate dihydrate, the amount of deflection and the swelling ratio of the gypsum board can be substantially reduced. Also, it can be appreciated that the compressive strength may be increased as well. In particular, even when the amount of tartaric acid added is merely about 0.005 parts by The resulting gypsum boards were each subjected to a deflection test, a swelling test, and a compressive strength test. The deflection test and the compressive strength test were conducted in the same manner as Experimental Example 3, and as such, descriptions thereof are omitted. Also, the swelling test was performed in the same manner as Experimental Example 5, and as such, a description thereof is omitted.

The evaluation results obtained for the present experimental examples are indicated in Table 6 below.

TABLE 6

| | EXPERIMENTAL EXAMPLE 6-1 | EXPERIMENTAL EXAMPLE 6-2 | EXPERIMENTAL EXAMPLE 6-3 |
|---|---|---|---|
| CARBOXYLIC ACID OR CARBOXYLATE | TARTARIC ACID | CITRIC ACID | SUCCINIC ACID |
| DEFLECTION (mm) | 22 | 31 | 33 |
| SWELLING RATIO (%) | 0.08 | 0.12 | 0.13 |
| COMPRESSIVE STRENGTH (N) | 921 | 915 | 907 |

As can be appreciated from comparing the evaluations for Experimental Examples 6-1 through Experimental Example 6-3 shown in Table 6 with the evaluations for Experimental Example 5-1 and Experimental Example 5-3, not only tartaric acid, but also citric acid and succinic acid can be added to promote the effects of suppressing deflection and substantially decreasing the swelling ratio of a gypsum board. That is, the effects of suppressing deflection and improving the dimensional stability of the gypsum hardened body were achieved in the present experimental examples.

Also, it can be appreciated that by adding citric acid or succinic acid in addition to adding calcium hydrogen phosphate dihydrate, the compressive strength of the gypsum hardened body can be increased.

Although a gypsum hardened body, a gypsum panel, a method for manufacturing a gypsum hardened body, and a method of manufacturing a gypsum board have been described above with respect to illustrative embodiments, the present invention is not limited to the above embodiments. For example, numerous variations and modifications of the above embodiments may be made without departing from the scope of the present invention.

The present application is based on and claims the benefit of priority of Japanese Patent Application No. 2014-097160 filed on May 8, 2014, the entire contents of which are herein incorporated by reference.

DESCRIPTION OF THE REFERENCE NUMERALS 11, 16 base paper
13 (high-density) gypsum slurry
14 (low-density) gypsum slurry

The invention claimed is:

1. A gypsum hardened body comprising:
a gypsum slurry that has been hardened;
wherein the gypsum slurry is obtained by mixing calcined gypsum, calcium hydrogen phosphate dihydrate, water, and foam; and
wherein a specific gravity of the gypsum hardened body is greater than or equal to 0.3 and less than or equal to 0.8.

2. The gypsum hardened body according to claim 1, wherein
the gypsum slurry includes the calcium hydrogen phosphate dihydrate at an amount greater than or equal to 0.01 part by mass and less than or equal to 5 parts by mass with respect to 100 parts by mass of the calcined gypsum.

3. The gypsum hardened body according to claim 1, wherein
the gypsum slurry includes the calcium hydrogen phosphate dihydrate at an amount greater than or equal to 0.05 parts by mass and less than or equal to 1 part by mass with respect to 100 parts by mass of the calcined gypsum.

4. The gypsum hardened body according to claim 1, wherein the specific gravity of the gypsum hardened body is greater than or equal to 0.3 and less than or equal to 0.5.

5. The gypsum hardened body according to claim 1, wherein the gypsum slurry further includes an organic carboxylic acid and/or an organic carboxylic acid salt.

6. The gypsum hardened body according to claim 5, wherein
the organic carboxylic acid and/or the organic carboxylic acid salt includes at least one organic carboxylic acid selected from a group consisting of formic acid, acetic acid, propionic acid, butyric acid, valeric acid, acrylic acid, methacrylic acid, propiolic acid, oleic acid, maleic acid, fumaric acid, oxalic acid, malonic acid, succinic acid, glutaric acid, adipic acid, tartaric acid, citric acid, malic acid, gluconic acid, and lactic acid; and/or at least one salt of at least one organic carboxylic acid selected from the group.

7. The gypsum hardened body according to claim 5, wherein
the gypsum slurry includes the organic carboxylic acid and/or the organic carboxylic acid salt at an amount greater than or equal to 0.005 parts by mass and less than or equal to 0.2 parts by mass with respect to 100 parts by mass of the calcined gypsum.

8. The gypsum hardened body according to claim 1, wherein
the calcined gypsum includes β-calcined gypsum.

9. A gypsum panel including the gypsum hardened body according to claim 1 as a core material.

10. The gypsum panel according to claim 9, wherein the gypsum panel is a gypsum board.

11. The gypsum panel according to claim 9, wherein an amount of deflection of the gypsum panel is less than or equal to 100 mm.

12. A method for manufacturing a gypsum hardened body, comprising:
a gypsum slurry manufacturing step for manufacturing a gypsum slurry by mixing calcined gypsum, calcium hydrogen phosphate dihydrate, water, and foam;
a shaping step for shaping the gypsum slurry into a shaped body; and
a hardening step for hardening the shaped body obtained in the shaping step to obtain the gypsum hardened body;
wherein a specific gravity of the obtained gypsum hardened body is greater than or equal to 0.3 and less than or equal to 0.8.

13. A method for manufacturing a gypsum board, comprising:
a gypsum slurry manufacturing step for manufacturing a gypsum slurry by mixing calcined gypsum, calcium hydrogen phosphate dihydrate, water, and foam;
a shaping step for arranging the gypsum slurry between base paper and shaping the gypsum slurry into a shaped body; and a hardening step for hardening the shaped body obtained in the shaping step to obtain the gypsum hardened body;

wherein a specific gravity of the obtained gypsum hardened body is greater than or equal to 0.3 and less than or equal to 0.8.

* * * * *